C. A. BATES AND E. FULTS.
SCREW DRIVER.
APPLICATION FILED MAY 23, 1921.

1,424,275.

Patented Aug. 1, 1922.

Clarence A. Bates
Edwin Fults
INVENTOR

BY Victor J. Evans
ATTORNEY

UNITED STATES PATENT OFFICE.

CLARENCE A. BATES AND EDWIN FULTS, OF CANASTOTA, NEW YORK.

SCREW DRIVER.

1,424,275.   Specification of Letters Patent.   Patented Aug. 1, 1922.

Application filed May 23, 1921. Serial No. 472,018.

*To all whom it may concern:*

Be it known that we, CLARENCE A. BATES and EDWIN FULTS, citizens of the United States, residing at Canastota, in the county of Madison and State of New York, have invented new and useful Improvements in Screw Drivers, of which the following is a specification.

Our present invention has reference to an improved screw driver.

Our object is to produce an instrument of this character comprising a handle having a shank extension to which is pivoted a member having its ends provided with right angularly disposed blades which are spring influenced whereby the member may be held in longitudinal alignment with the shank to permit of a screw being acted on in the ordinary manner, and also whereby the said member may be arranged at a right angle with respect to the shaft so that the handle may be sustained horizontally and turned to engage with screws which are so located that the same could not be properly or conveniently engaged when the blade is arranged longitudinally with respect to the shank.

The foregoing, and other objects which will appear as the nature of the invention is better understood, may be accomplished by a construction, combination and operative association of parts, such as is disclosed by the drawings which accompany and which form part of this specification.

In the drawings:—

Figure 5 is a transverse sectional view on the line 5—5 of Figure 2.

Figure 1:
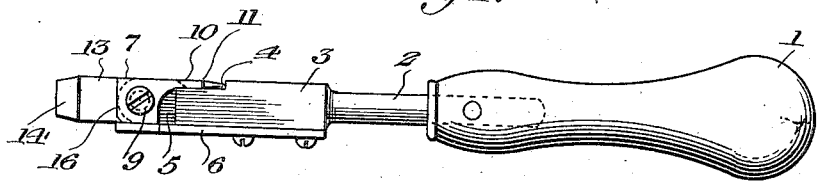
Figure 1 is an elevation showing the blade carrying member arranged longitudinally on the shank.
Figure 2:
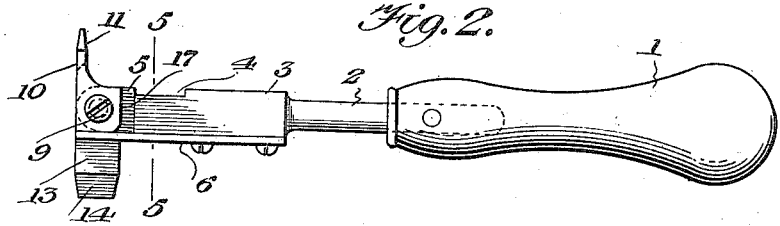
Figure 2 is a similar view but showing the blade carrying member arranged right angularly with respect to the shank.
Figure 3:
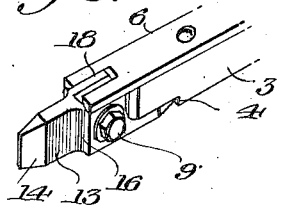
Figure 3 is a view showing the contacting engagement of the springs with the pivoted blade carrying member when the device is in the position illustrated in Figure 1.
Figure 4:
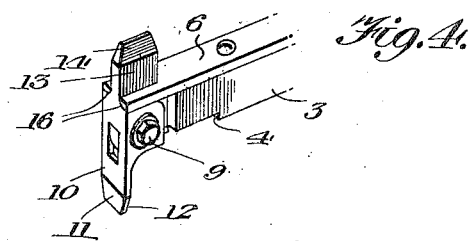
Figure 4 is a similar view with the device arranged in the position illustrated in Figure 2.
Figure 6:
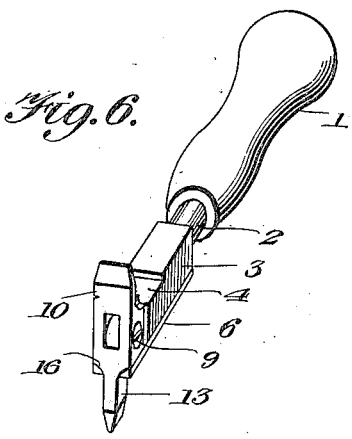
Figure 6 is a perspective view looking toward the end of the shank.
Figure 7:
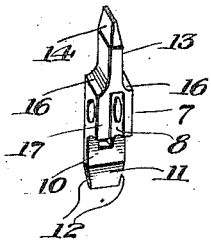
Figure 7 is a perspective view of the blade carrying member.
Figure 8:
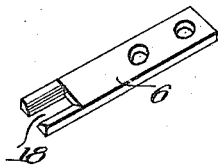
Figure 8 is a similar view of the spring.

A handle 1 is provided with a shank extension 2, the latter being enlarged, as at 3, for a considerable distance from its outer end. The enlarged end 3 of the shank is preferably square in cross section and has one of its faces notched to form a pocket 4, the said enlargement, directly outward with respect to the pocket being centrally formed with an ear 5.

On the face of the shank enlargement 3, opposite that provided with the notch there is secured a flat spring 6.

The blade carrying member comprises a substantially rectangular body 7 approximately centrally formed with an opening 8 that receives therein the ear 5, the body being pivotally connected to the ear by a removable pivot member 9. The body 7 has its inner face from one of the corners thereof reduced or cut-away, providing a reduced extension 10 that has its faces beveled transversely from the center to the end thereof, thus providing a blade 11. Also the sides of the extension 10 are inclined, as at 12 toward the edge of the blade. The body has its side faces cutaway outward of the opening 8 at the opposite end of the said body or otherwise formed with a central extension 13 which is arranged right angularly with respect to the extension 10. The extension 13 has its faces beveled to its end providing the said end with a blade 14. For distinction, the shoulders provided between the body and the extension or shank 13 of the blade 14 are indicated by the numeral 16, and the inner flat face of the body by the numeral 17.

The outer end of the flat spring 6 is centrally slotted, as at 18, the said slot receiving therein the shank or body portion 13 of the blade 14, when the blade carrying member 7 is arranged right angularly with respect to the shank 2. The contacting engagement of the arms of the spring to the opposite sides of the slot 18 therein, with the shoulders 16, effectively hold the member 7 at a right angle with respect to the shank 2. Thus the member 7 may be arranged to provide the shank 2 with two laterally arranged right angularly extending blades, either of which may be inserted in the kerfed head of a screw to permit of the handle being swung horizontally. A pressure can be exerted on the shank to more effectively force either of the blades 11 or 14 in the kerf of the screw which will materially facilitate the driving or unscrewing of the screw.

When the member 7 is swung on its pivot 9 and the reduced inner face of the extension or shank 10 of the blade 11 is received in the socket 4, the spring 11 will have its slotted end contacting with the face 17 of the member 7, thus effectively holding the member in longitudinal alignment with the shank and permitting the blade 14 to be employed in the ordinary manner.

Having described the invention, we claim:

A screw driver including a handle having a shank provided at its outer end with a reduced ear, a member having an opening therein receiving the ear and being pivotally connected to the ear, said member having a reduced extension on the outer face thereof projecting in one direction from the opening therein, and having a sharpened end to provide a blade, said member, at the end thereof opposite the blade being formed with a central extension arranged right angularly with respect to the first mentioned extension and also terminating in a blade, and a spring secured to the shank and having a bifurcated end designed to contact with the body of the member when the member is swung to bring the first mentioned blade over the shank and the second mentioned blade in longitudinal alignment with the shank, and to also contact with the shoulders provided between the member and the second mentioned blade when the member is swung right angularly with respect to the shank.

In testimony whereof we affix our signatures.

CLARENCE A. BATES.
EDWIN FULTS.